Patented Oct. 24, 1922.

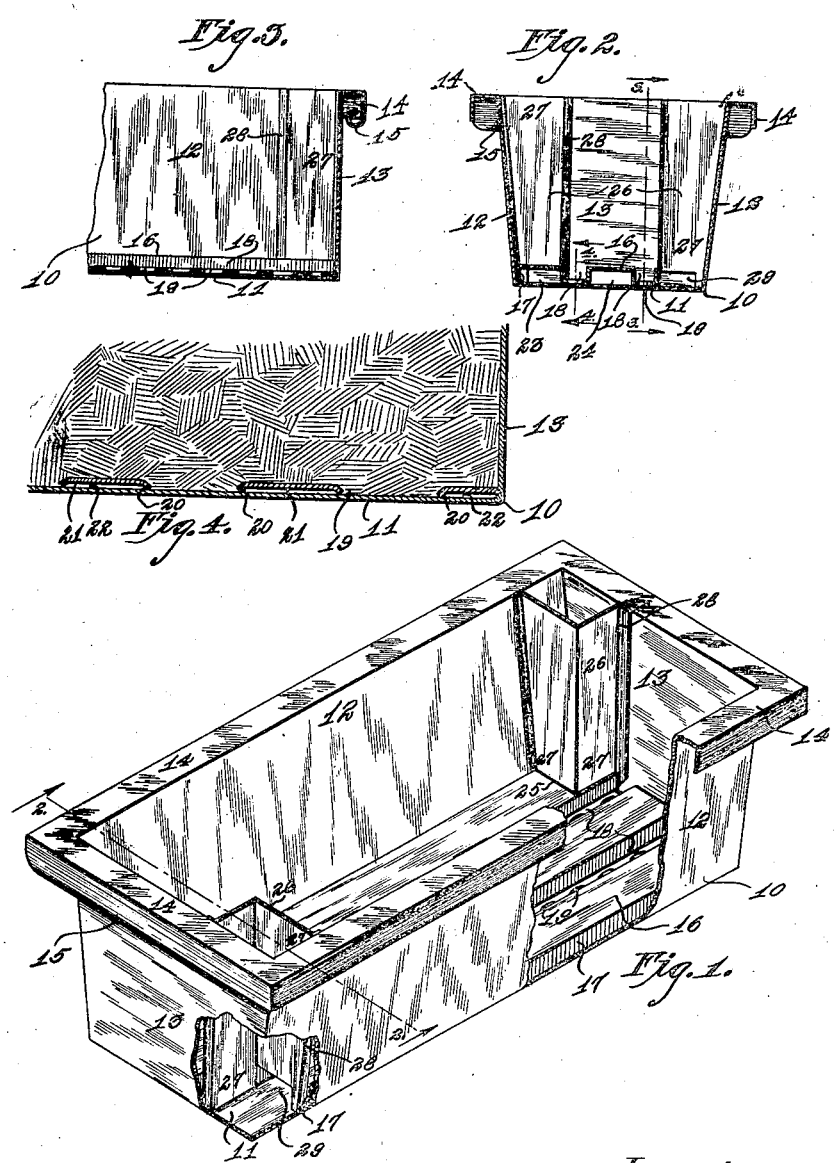

1,433,043

UNITED STATES PATENT OFFICE.

DARIUS E. SHRAUGER, OF ATLANTIC, IOWA.

FLOWER BOX.

Application filed December 20, 1921. Serial No. 523,775.

*To all whom it may concern:*

Be it known that I, DARIUS E. SHRAUGER, a citizen of the United States, and a resident of Atlantic, in the county of Cass and State of Iowa, have invented a certain new and useful Flower Box, of which the following is a specification.

The object of my invention is to provide a flower box of simple durable and inexpensive construction, the purpose of which is to receive dirt in which growing plants are placed, and having means whereby the soil may be automatically, to a certain extent, subirrigated.

A further object is to provide a flower box having a subirrigating device which is detachably secured to the inside of the box in such a manner that it may be easily and quickly placed therein or removed for the purpose of cleaning the box and the said subirrigating device whenever it is desired.

A further object is to provide in a flower box, improved means for subirrigating the soil in such a manner that the proper amount of moisture will be automatically fed to the soil through capillary attraction to replace the moisture evaporated and taken up by the plants.

These and other objects will be apparent to those skilled in the art.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is an isometric view of my improved flower box having a portion of the side walls broken away to show the subirrigating device within.

Figure 2 is a transverse, sectional view taken on the line 2—2 of Figure 1.

Figure 3 is a detail, sectional view taken on the line 3—3 of Figure 2.

Figure 4 is a detail, sectional view taken on the line 4—4 of Figure 2 showing the soil in place within the box.

My improved device comprises substantially a rectangular box 10 having a bottom 11, side members 12 and end members 13, the upper edge of said side and end members being provided with outwardly and downwardly extending flange 14. This flange serves the purpose of strengthening the box.

The end flanges are curled inwardly at 15, as clearly shown in Figure 3. This curled in portion serves the purpose of handles which may be easily grasped by the attendant for the purpose of lifting the box from one position to another.

The box is preferably made of thin sheet metal which may be treated with a preservative such as paint, tin or galvanizing, the sides, ends and bottom being secured together in such a manner to form water tight joints.

Thus it will be seen that I have provided a water tight container in which the soil for the plants may be placed, and when so placed, the moisture and water in the same will not escape to injure or moisten the stand on which the box may be placed.

For irrigating the soil within the box, I have provided an irrigating device 16 formed preferably of a single piece of sheet metal. This plate 16 is provided with flanges 17 designed to engage the side members 12 of the box, the plate 16 being folded to form longitudinal grooves or recesses 18, clearly shown in Figures 1 and 2.

The bottom of each of the recesses 18 is provided with a series of openings 19, each of which is provided with a downwardly extending flange 20, clearly shown in Figure 4. These flanges are substantially about one-sixteenth of an inch deep so that the bottom portion 21 of the recesses 18 will be elevated above the bottom 11 of the box by the flanges 20 engaging the same, so that water spaces 22 are provided, whereby water compartments 23 and 24 are in communication with each other.

Two of the opposite and diagonal corners of said plate 16 are each provided with an opening 25 of a width substantially equal to the width of the water compartment 23. These openings 25 are designed to receive a vertically arranged plate 26 having side members 27 arranged at right angles to each other, each of said side members being provided with an outwardly extending flange 28.

The plate 26 is designed to rest vertically in each of the corners of said box corresponding to the openings 25 in such a manner that the lower end of said plate will enter said opening with the flanges 28 adjacent to their respective side and end members 12 and 13, as clearly shown in Figure 1.

The lower end of the plate 27 which rests against the side members 12 is cut short so that an opening 29 is provided which will communicate with the compartment 23, the longer one of the plates 27 being of a length equal to the depth of the box so their upper edges are even with the upper face of the flange 14.

The lower ends of the flanges 28 are designed to rest upon the bottom 11 and are secured between the flanges 17 and the end of the plate 16 in such a manner that the member 26 will be held in a vertical position with no other fastening except as just described.

The member 26, when placed in the corners of the box as illustrated in Figure 1, forms wells through which water may be poured to the water compartments 23 and 24.

By this arrangement, it will be seen that the members 26 may be easily and quickly withdrawn, after which the plate 16 may be removed so that the bottom of the box as well as the inside of the water compartments 23 and 24 and also the wells may be easily and quickly cleaned when desired.

It will also be seen that I have provided a construction which is very simple in manufacture, and one in which its parts may be detachably assembled without the use of bolts or making holes through the walls of the box.

Assuming that the parts have been assembled as described and the box has been filled with dirt with the wells open, it will be seen that the pressure of the dirt will assist in keeping the members 26 in position, the operation of the device is substantially as follows.

Whenever it is desired, water may be supplied through the subirrigating devices by simply pouring it through one or both of the said wells until it reaches a level substantially even with the top of the compartments 23 and 24. The water will enter the compartment 24 through the grooves 22, a portion of the dirt within the box will rest on top of the plate 16, and a portion will enter the recesses 18 and will pass through the openings 19 and rest on the bottom plate 11, as clearly shown in Figure 4. The water within the grooves 22 will pass beneath the edges of the flanges 20 and enter the soil within the recess 18, after which it will pass upwardly through the soil above by capillary attraction.

By this arrangement, it will be seen that a small portion of the soil within the box actually comes in contact with the water. The water within the recesses 18 will be on a level with the compartments 23 and 24, but this is below the main body of the dirt so that the roots of the plants in no time have to enter soil that is saturated with water.

The filling of the compartments 23 and 24 through the wells has a tendency to drive some of the air within the compartments 23 and 24 through the soil in such a manner that the soil is always properly aerated.

It will also be seen that at all times, except when the wells 25 are absolutely full, air is free to circulate in said compartments through the wells, and the said compartments are always properly ventilated.

By providing the compartments 23 with the flanges 17 and the plate 26, I have provided means whereby water may be poured to the bottom part of the box without the soil within the box being washed into said compartments, due to the fact that the flanges 20 of the openings 19 engage the plate 11 so that the said soil cannot escape, and also to the fact that the said flanges are so placed that their lower edges do not come in direct contact with a current of water as it enters the compartment 23.

Therefore, it will be seen that I have provided a flower box of simple, durable and inexpensive construction provided with a subirrigating device which may be easily and quickly removed from the box whenever it is desired. In fact when it is desired to empty the box of soil, all the attendant has to do is to invert the box and remove the same, at which time the irrigating members will also be removed with the soil, after which they may be easily and quickly cleaned, and also the bottom of the box. After they have been cleaned they may be placed in position without having to adjust any nuts or similar locking devices.

I claim as my invention:

1. The combination of a flower box, a subirrigating device comprising a metal plate fitted to the interior of the flower box and formed with a series of water compartments open at the bottom, said plate being also formed with a recessed portion open at its top and having its bottom close to the bottom of the flower box, the metal plate at said recess being formed with a series of openings, and the material surrounding the openings being provided with downwardly extending flanges to engage the bottom of the flower box and to hold the body of the recessed portion slightly spaced above the bottom of the flower box, and whereby water may circulate from the water compartments between the recessed portion and the bottom of the flower box, and whereby earth in the interior of the flower box and the said recesses may engage the bottom of the flower box through said openings, but cannot enter the water circulating spaces because of said flanges engaging the bottom of the flower box around the openings, for the purposes stated.

2. The combination with a flower box of a plate formed into an alternate series of compartments and recesses, the outside ones of said compartments each being provided with an opening at one end, an angular plate detachably fitted to two of the sides of said opening and mounted vertically thereto, the said plate being designed to fit the bottom edges of the inner faces of the flower box with the edges of said vertical angular plates adjacent to corresponding side and end members of the box so that a well is provided between said angular plate and the said side walls to communicate with the water compartment, the bottom of each of said recesses being provided with a series of openings, each of said openings being provided with a downwardly extending flange to engage the bottom of the flower box, the said flanges being so arranged that the bottom of said recesses will be held a slight distance above the bottom of the flower box to form passages for communicating with said water compartments, and also for feeding water between the edges of said flanges and said bottom to said openings.

DARIUS E. SHRAUGER.